Figure 1:
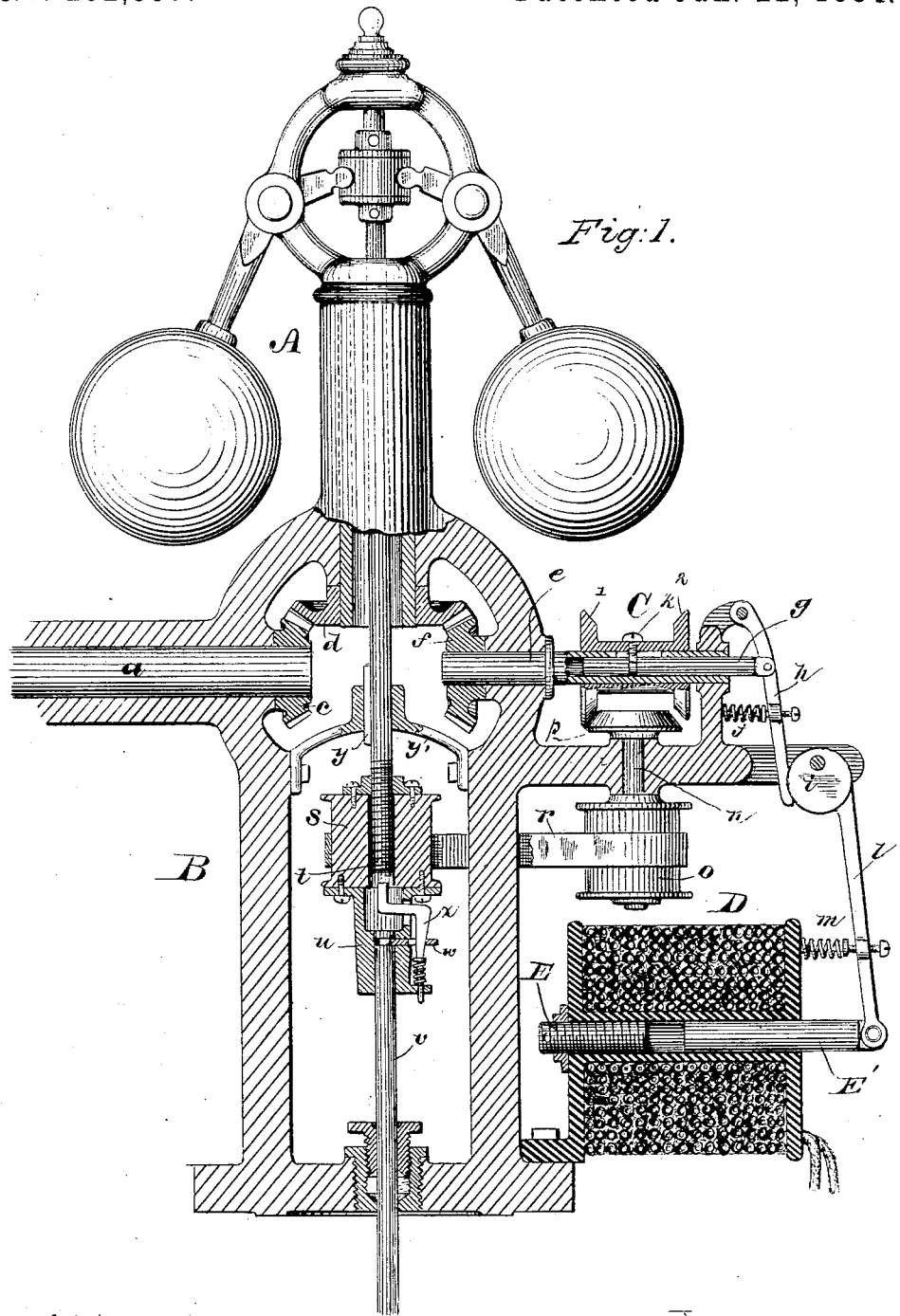

(No Model.) 2 Sheets—Sheet 1.

E. H. AMET.
REGULATOR FOR DYNAMO ELECTRIC MACHINES.

No. 292,397. Patented Jan. 22, 1884.

Attest
Frederick S. Baker
Edgar Blake

Inventor
Edward H. Amet.
By Baker and Donlin
Attorneys.

(No Model.)
2 Sheets—Sheet 2.

E. H. AMET.
REGULATOR FOR DYNAMO ELECTRIC MACHINES.

No. 292,397. Patented Jan. 22, 1884.

Attest
Paul A. Staley
Frederick S. Baker

Inventor
Edward H. Amet
By
Baker and Donlin
Attorneys

UNITED STATES PATENT OFFICE.

EDWARD H. AMET, OF LA GRANGE, ASSIGNOR OF ONE-HALF TO HERBERT A. STREETER, OF CHICAGO, ILLINOIS.

REGULATOR FOR DYNAMO-ELECTRIC MACHINES.

SPECIFICATION forming part of Letters Patent No. 292,397, dated January 22, 1884.

Application filed April 14, 1883. (No model.)

*To all whom it may concern:*

Be it known that I, EDWARD H. AMET, a resident of La Grange, Cook county, Illinois, have invented certain new and useful Improvements in Electric-Current Regulators, of which the following is a full, clear, concise, and exact description, sufficient to enable others skilled in the art to which it appertains to make and use the same.

My invention relates to mechanism for regulating electric currents, whereby an increase or decrease in the work to be performed in an electric circuit is compensated for by a corresponding increase or decrease in the amount of motive-force applied to the current-generator.

The object of my invention is to provide an electric-current generator adapted to regulate the amount of current generated to the work to be performed, and to control the motor which drives the generator at a suitable rate of speed to supply any amount of electro-motive force from nothing up to the full capacity of the generator or generators.

My invention consists in a governor for regulating the speed of a motor which drives an electric generator, in combination with a magnet in the main circuit, and mechanism adapted to change the governor so as to regulate and control said motor at different rates of speed, to compensate for an increase or decrease in the electro-motive force required.

My invention further consists in the arrangement and combination of parts, as hereinafter described, illustrated in the accompanying drawings, and particularly set forth in the claims.

In the accompanying drawings I have shown mechanism for carrying out my invention, which mechanism is particularly designed for use with generators to which power is supplied by steam. The invention, however, may be modified to suit various other motors and mechanisms with equally good results.

Similar letters of reference in the drawings refer to similar parts.

Figure 2:
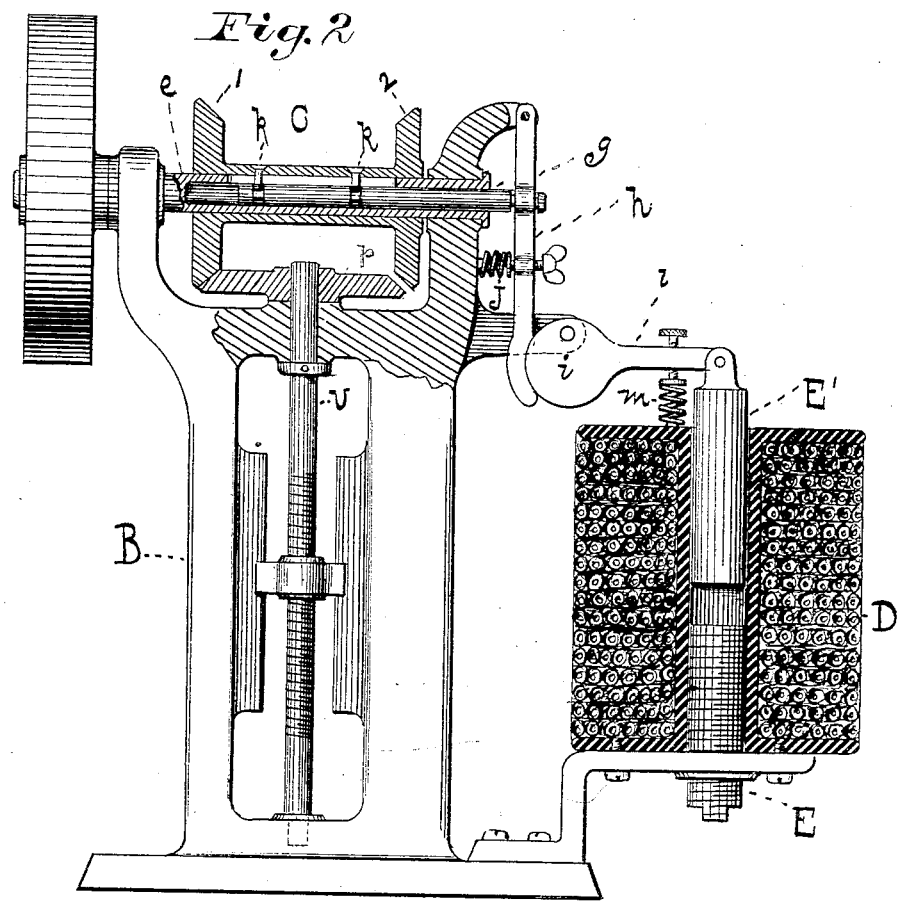

Figure 1 of the drawings represents a device embodying my invention as adapted for use with a steam-engine. Fig. 2 shows a modified form of my invention.

Referring to the drawings, A is a governor of the ordinary pattern, supported on main frame B, and receives its motion in the ordinary manner from shaft $a$ through the medium of bevel-gears $c$ and $d$. Running in a bearing in the main frame B, opposite to shaft $a$, is the shaft $e$, provided on its end with the bevel-gear $f$, which meshes with the bevel-gear $d$. The shaft $e$ is bored out for a portion of its length to receive a push-rod, $g$, connected at its outer end to lever $h$, the lower end of which is held against the cam $i$ by the action of spring $j$.

C is a double-beveled friction-wheel, provided with two faces, 1 and 2, mounted on the shaft $e$ in such a manner as to be rotated thereby, but at the same time free to be moved longitudinally thereon by the action of push-rod $g$, to which it is connected by means of screw $k$, said screw being projected into a groove in push-rod $g$, thus permitting shaft $e$ to rotate while push-rod $g$ remains stationary.

D is a solenoid of the usual form, having the adjustable screw-threaded core E and the movable core E', the latter core being free to move as in any solenoid, the force of axial magnetism being increased or decreased by screwing the adjustable core E in or out. To the end of the movable core E' is attached the arm $l$ of cam $i$, said cam being pressed outward against the magnetism of the solenoid by spring $m$. Journaled in a suitable bearing in the main frame B is the shaft $n$, carrying at its upper end a beveled friction-wheel, $p$, which is rotated in different directions by alternate contact with the faces 1 and 2 of friction-wheel C. The pulley $o$ is connected by a belt, $r$, to a similar pulley, $s$, which is mounted on the screw-threaded end of governor-stem $t$. To the bottom of pulley $s$ is attached a coupling, $u$, in which the valve-stem $v$ is secured by a sliding piece, $w$, through the end of which extends a wedge-shaped piece, $x$, which passes through a slot in the coupling $u$ and terminates a short distance below the governor-stem $t$. The governor-stem $t$ is held from turning by the feather $y$, which passes through the frame $y'$ in such a manner as to permit a free vertical movement of the stem $t$.

Supposing my device to be attached to a steam-engine driving an electric generator for supplying current to a circuit containing any given number of electric lamps, the solenoid D is connected directly into the circuit with the lamps and the electric generator in any of the ways well known in the art. Axial magnetism is thus produced in the solenoid D, which is properly adjusted by screwing the adjustable core E in or out until an equilibrium is established. The friction-wheel C is thus kept free from the friction-wheel $p$. If, now, the number of lamps is increased, the current is weakened proportionately, and the strength of the axial magnetism in solenoid D is also decreased in like proportion. This decrease of axial magnetism disturbs the equilibrium above referred to, and the movable core E' is forced outward by spring $m$. This outward movement of the core E', through the medium of arm $l$, turns cam $i$. The lever $h$ is thus relieved, and by means of spring $j$, through the medium of push-rod $g$, brings one of the faces 1 of friction-wheel C in contact with friction-wheel $p$. This friction-wheel C, being continuously revolved by gear $f$, before described, rotates the friction-wheel $p$ and shaft $n$ and pulley $s$. The pulley $s$ in the governor-stem $t$ is thus revolved, and, climbing the screw-threaded end of said stem, the valve-stem $v$ is shortened and a greater volume of steam is admitted, thereby increasing correspondingly the speed of the engine, the generator, and the current. In case one or more lamps are switched out of circuit, a corresponding increase of axial magnetism is developed in the solenoid D, causing the movable core E' to be drawn in and the opposite face, 2, of friction-wheel C is brought against friction-wheel $p$, which is rotated in the reverse direction from that before described, and the valve-stem $v$ is lengthened by the running down of the pulley $s$ on the governor-stem $t$. Thus the least variation in the current will produce a corresponding variation in the speed of the generator and engine, and the current will be automatically regulated accordingly. As long as the number of lamps in a circuit remains unchanged, an equilibrium is maintained in the solenoid D, and the friction-wheel C runs free of friction-wheel $p$. The governor A is thus free to regulate the speed of the engine or to keep the engine at a normal speed by the centrifugal force of the balls in the ordinary manner. In case of an open circuit, the pulley $s$ will climb the governor-stem $t$ until the end of wedge-shaped piece $x$ comes in contact with the end of said stem $t$. This wedge-shaped piece $x$ will thus be forced downward through the sliding piece $w$, which will thus be drawn out, relieving the valve-stem $v$ from coupling $u$, and the valve-stem $v$ will fall by its own weight, thus throttling the engine. It will thus be seen that an electric generator may be run from one lamp to its full capacity, or turned from its full capacity down to one lamp, the current being automatically varied to suit the different changes.

It is obvious that the regulating device may be used either in connection with the governor or may be an independent device, as shown in Fig. 2, which, by suitable connections with the throttle or other valve, may control the speed of the engine or other motive power, motion being supplied in any suitable manner.

I wish it expressly understood that I do not limit the use of my invention to steam or other engines, but extend its application to all motive powers.

Having thus described my invention, what I claim as new, and desire to secure by Letters Patent, is—

1. In a system for generating and applying an electric current, the combination of a motor for driving a dynamo-electric machine, a solenoid actuated by the current produced, a shaft adapted to be constantly rotated, and having a sliding double-cone gear mounted thereon, a second shaft having a traveling nut thereon, which is connected with said motor, and means, substantially as shown and described, whereby the motion of the core of the solenoid is conveyed to the double-cone gear, and its motion is conveyed to the said nut to rotate it in either direction, substantially as and for the purposes set forth.

2. In an electric current-regulating system, a screw-threaded shaft connected with a motor by suitable means, including a traveling nut on said shaft, in combination with a solenoid the core of which is connected with means for moving said nut in opposite directions, substantially as specified.

3. In mechanism for controlling a motor for a dynamo-electric machine, a motor-governor comprising a screw-threaded shaft and a nut fitted thereon, in combination with a sliding double-cone gear suitably connected with means for rotating said nut in opposite directions and with a solenoid, substantially as and for the purpose set forth.

4. The combination of a solenoid with a centrifugal governor having a screw-threaded stem, a nut carrying a pulley, and a valve-stem coupling, with means for rotating said nut in opposite directions, substantially as specified.

5. The combination of a solenoid with a centrifugal governor having a screw-threaded stem, a nut carrying a pulley, and a valve-stem coupling, with means for automatically uncoupling the valve-stem, substantially as specified.

6. The combination of a centrifugal governor, a positively-driven shaft continuously connected therewith, and carrying a sliding double-cone gear connected with the core of a solenoid, with a second shaft carrying a single-cone gear and connected with a climbing nut connecting the governor-stem to the valve-stem of a motor, substantially as specified.

7. The combination of the solenoid D, cam $i$, lever $h$, rod $g$, shaft $e$, and gear C, with shaft $n$, cone-gear $p$, pulleys $o$ $s$, screw-threaded governor-stem $t$, coupling $u$, and valve-stem $v$, substantially as shown and described.

8. The combination of the solenoid D, gears C $p$, pulleys $o$ $s$, stems $t$ $v$, coupling $u$, wedge $x$, and key $w$, substantially as shown and described.

9. The combination of the solenoid D, having the adjustable plug E, with the lever $l$, spring $m$, cam $i$, lever $h$, spring $j$, and rod $g$, substantially as shown and described.

EDWARD H. AMET.

Witnesses:
M. H. EATON,
L. S. TOWNSEND.